United States Patent Office 3,107,237
Patented Oct. 15, 1963

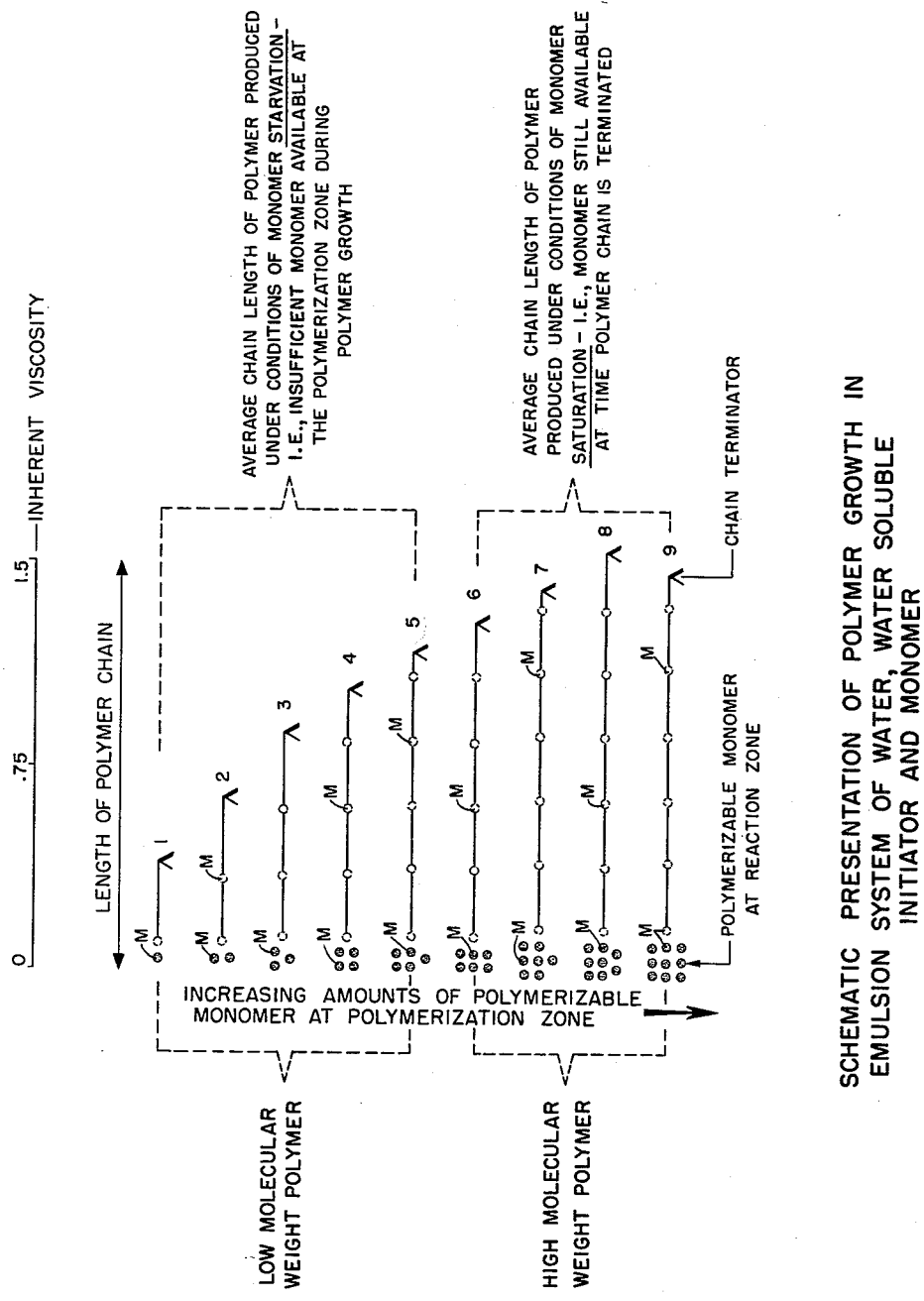

3,107,237
METHOD OF MAKING LOW MOLECULAR
WEIGHT VINYL RESIN
Edwin Studley Smith, Cuyahoga Falls, Ohio, assignor to
The Goodyear Tire & Rubber Company, Akron, Ohio,
a corporation of Ohio
Filed Nov. 28, 1958, Ser. No. 776,865
4 Claims. (Cl. 260—92.8)

This invention relates to the polymerization of olefinically unsaturated monomeric compounds and pertains particularly to a method of controlling the molecular weight the polymer is allowed to attain.

It is well known that the emulsion polymerization of substantially water-insoluble olefinically unsaturated monomers and particularly polymerizable vinylidene monomers containing the polymerizable group $CH_2=C<$ in the presence of a water-soluble polymerization initiator and a surfactant will result in the formation of polymers having a relatively high molecular weight if, for example, the monomers being polymerized are present in such an amount that the reaction zone is saturated at all times with respect to monomer. Although many uses are known for these relatively high molecular weight vinyl polymers, relatively low molecular weight vinyl polymers are more desirable for some uses, such as for molding operations requiring a resin having a fast flow rate under heat, particularly in the molding of phonograph records.

It is an object of the present invention to provide a process for the manufacture of a polymer, the molecular weight of which can be controlled.

It is a further object of this invention to bring about the polymerization of an olefinically unsaturated monomer and particularly a vinyl monomer in an emulsion system containing a liquid-soluble and particularly a water-soluble polymerization initiator and a surfactant by controlling the amount of polymerizable monomer available in the polymerization zone.

Another object of the present invention is to adjust the amount of monomer in the polymerization zone so that less than a saturation amount of monomer is present in the polymerization zone.

A still further object of this invention is to adjust the rate monomer is introduced into the polymerization zone by controlling the rate at which the monomer is dispersed throughout the aqueous emulsion.

Still another object of this invention is to adjust the rate the monomer is made available at the reaction zone by maintaining the vapor pressure in the reaction vessel at a value less than the value obtained under conditions when the monomer is present in a saturation amount.

It has been discovered that a polymer may be produced having a relatively low molecular weight and a relatively low inherent viscosity when the amount of monomer available at the polymerization zone is less than that amount which would otherwise be used up before chain growth is terminated in forming polymer in an aqueous emulsion containing a water-soluble polymerization initiator and a surfactant. This process may be conveniently referred to as the "starvation" process and is in contrast to a process where the system is saturated with respect to monomer.

Thus, it has now been discovered that, in any given emulsion polymerization system for the polymerization of an olefinically unsaturated monomer, the molecular weight of the resulting polymer can be adjusted to a relatively low value by controlling the amount of monomer present at any one time in the polymerization zone.

Theoretically, it is visualized that the molecularly dispersed polymerization initiator is by itself a polymerization zone moving about in the water phase of the polymerization system. The polymerizable monomer representing the oil phase and being relatively insoluble in the water phase is, however, believed to be molecularly dissolved to a limited degree in the water phase and, depending upon the energy used through agitation in dispersing the liquid vinyl monomer throughout the water phase, the water phase becomes saturated with monomer. As soon as a monomer molecule comes in contact with a radical or fragment of the polymerization initiator, an activated monomer unit comes into being and, upon contact with a second monomer molecule, forms an active dimer, trimer, etc., at such a rate as the monomer molecules are made available at the polymerization zone represented by the active unit just described, and forms to a chain length determined by the amount of monomer available at the reaction zone during the time polymer chain is forming. The activated polymer chain ceases to grow as soon as it is "killed" or deactivated by contact with another activated unit or active polymer chain. This theory is set forth by W. V. Smith and R. H. Ewart in Chem. Phys., 16, 592 (1948).

Another polymerization zone is theoretically visualized as forming in a soap micelle where several monomer molecules have gathered. As soon as a polymerization initiator fragment enters the micelle containing the monomer molecules, polymerization takes place and forms an active polymer of an ever increasing chain length. The chain length depends upon the number of monomer molecules present. Again the length of the polymer chain is determined in the same manner as described above.

In any given emulsion polymerization system the rate of polymerization is fixed in that monomer is always used up at a certain speed in forming the polymer. However, in conventional systems where the polymer chain is permitted to form in the presence of a system saturated with monomer molecules, a high molecular weight or long chain length polymer forms before it is "killed" or deactivated by another chain or active fragment. It was surprising to discover that a low molecular weight polymer or short chain length polymer could be produced by "starving" the polymerization system of polymerization monomer by causing polymerization under conditions in which the polymerizable monomer is present at the reaction zone in less than a saturation amount or in which the polymerizable monomer appears at the reaction zone at a rate less than the rate at which the monomer could be converted to polymer because it was not realized that the rate of termination was substantially unaffected by the amount of monomer present.

A schematic presentation of the theory of the mechanism of chain formation is set forth in the drawing which in most part is self-explanatory. The source of polymerizable monomer is not shown since this is not an essential part of the invention. However, the rate at which monomer is made available at the reaction zone is shown by the small solid circles identified as M for monomer, each circle representing a quantity of monomer necessary to form a link in the chains schematically shown to the right of the circles and identified by the numerals 1 through 9. The broken circles represent monomer now used up in forming the links between each broken unit. The schematic presentation of polymer chain length is also expressed in terms of inherent viscosity which ranges from 0 for the monomer represented by M on the left to about 1.5. The polymers identified as 6 through 9 which have been formed under conditions where the monomer is present in the polymerization zone at a saturation level have an inherent viscosity of about 1.5. The polymers identified as 5 through 1 have inherent viscosity values progressively less than 1.5 since these polymers were formed under conditions of starvation of monomer in the polymerization zone. For purposes of this schematic presentation, it is to be understood that the conditions of polymerization are the same in all instances except as noted in the presentation with respect to amount of polymerizable monomer present at the reaction zone.

With this theory of polymerization in mind, it was then discovered that reducing the concentration or amount of monomer at the reaction zone could be achieved in a number of ways. For example, it was found that the amount of monomer at the reaction zone could be reduced to achieve what could be described as a starved condition by controlling the rate at which the liquid monomer was mechanically dispersed throughout the aqueous phase.

Another method of starving the polymerization zone of polymerizable monomer is to carry out the polymerization of a polymerizable monomer in an aqueous polymerization system while pumping the monomer into the polymerization vessel at a rate slower than the rate necessary to satisfy its desire to polymerize. The pumping rate is controlled by maintaining the vapor pressure above the aqueous system at a value less than the value for the vapor pressure exerted when the aqueous system is saturated with polymerizable monomer.

The following example shows that a high molecular weight polyvinyl chloride is produced when the polymerization zone is permitted to be saturated at all times with vinyl chloride by agitating the system at the rate indicated:

Example 1

The following ingredients were charged to a five gallon cylindrical reactor ten inches in diameter and 15½ inches deep after evacuating the reactor to remove air:

| | |
|---|---|
| Vinyl chloride _____ pounds __ | 6 |
| Sodium carbonate _____ grams __ | 17 |
| Sodium lauryl sulfate _____ do ____ | 5 |
| Potassium persulfate _____ do ____ | 27 |
| Sodium thiosulfate _____ do ____ | 4.8 |
| Polyvinyl chloride seed latex containing 20% solids _____ grams __ | 117 |
| Distilled water _____ pounds __ | 23 |

The temperature of the polymerization system was controlled at 105° F. and the above ingredients agitated at 83 r.p.m. The agitation was brought about by the use of a 6"—45° three bladed marine propeller mounted on a rotating shaft extending through the cover of the reactor to provide a one-half inch clearance from the bottom of the reactor. The propeller is mounted so that the liquid moves upwardly in the reactor. A 6" O.D.—45° Brumagin agitator having three equally spaced one-inch square faces was also mounted on the shaft one inch below the surface of the water phase of the polymerization system and above the propeller. The reactor was also provided with a two-inch wide baffle extending downwardly from the cover and adjacent to the wall of the reactor to a point adjacent a plane through the propeller. The lower portion of the baffle opposite the agitator blades is narrowed to one inch to make clearance for the rotation of the blades. After 6⅙ hours, the gauge pressure which remained at 74 to 75 p.s.i. during the reaction began to drop indicating that the polymerization was virtually complete. The product was coagulated, filtered, and dried. The inherent viscosity of the resulting vinyl chloride resin, as determined on a cyclohexanone solution containing 0.2 gram of the resin per 100 cc. of solvent, was 1.34 indicating that the vinyl resin was of high molecular weight.

The following examples show how a low molecular weight polyvinyl chloride can be produced by adjusting the agitation of the polymerization system to such a rate as to reduce the concentration of monomer at the reaction zone:

Example 2

Example 1 was repeated except that the agitators were rotated at 73 r.p.m. and the reaction required ten hours. The resulting polyvinyl chloride had an inherent viscosity of 1.02.

Example 3

Example 1 was repeated except the agitators were rotated at 48 r.p.m. and the reaction required 30 hours. The resulting polyvinyl chloride had an inherent viscosity of 0.59.

The following example shows another method of producing a low molecular weight vinyl chloride resin by reducing the concentration of monomer at the polymerization zone by carrying out the reaction under reduced vapor pressure:

Example 4

Example 1 was repeated except that the vinyl chloride monomer was added to the polymerization vessel throughout the polymerization reaction at such a rate as to maintain a vapor pressure of from 70 to 71 p.s.i. as measured by a gauge connected to the vapor space over the system. After the reaction was completed (10½ hours) the resulting resin had an inherent viscosity of 0.97.

The process of this invention for the production of low molecular weight polymers including copolymers is applicable to any polymerizable olefinically unsaturated monomer including those monomeric materials which contain a single methylene group attached to a carbon atom by a double bond and monomers which are substantially water-insoluble compounds capable of addition polymerization in an aqeous medium to form high molecular weight polymers insoluble in the medium in which they are formed. Among such monomers are the vinyl aromatics, such as styrene, methyl styrene, p-chlorostyrene, or divinyl benzene; esters of alpha-methylene aliphatic monocarboxylic acids, such as methyl acrylate, ethyl acrylate, n-butyl acrylate, isobutyl acrylate, dodecyl acrylate, 2 - chlorethyl acrylate, 2 - chloropropyl acrylate, 2,2'-dichloroisopropyl acrylate, phenyl acrylate, cyclohexyl acrylate, methyl alpha-chloroacrylate, methyl methacrylate, ethyl methacrylate, methyl ethacrylate; acrylonitrile, methacrylonitrile; acrylamide; vinyl esters, such as vinyl acetate, vinyl chloroacetate, vinyl propionate, vinyl butyrate; vinyl halides, such as vinyl chloride or vinyl bromide; vinyl ethers, such as vinyl methyl ether, vinyl isobutyl ether, vinyl 2-chlorethyl ether; vinyl ketones, such as vinyl methyl ketone, vinyl hexyl ketone, methyl isopropenyl ketone; vinylidene halides, such as vinylidene chloride, vinylidene chlorofluoride; N-vinyl compounds, such as N-vinyl pyrrole, N-vinyl carbazole, N-vinyl indole, N-vinyl succinimide; olefins, such as propylene, butadiene-1,3, isoprene or chloroprene; olefinically unsaturated esters, such as crotyl acetate, oleyl acetate, diallyl phthalate, diallyl maleate or ethylene glycol dimethacrylate; and other similar polymerizable materials which are substantially insoluble in the diluent phase of the polymerization system. The method of this invention is also applicable to the copolymerization of mixtures of two or more of these monomeric materials.

Any diluent may be used as the continuous phase of the polymerization system in which the polymerizable monomer is substantially insoluble and in which the initiator of polymerization for the monomer is soluble. It is preferred to use water for obvious reason of economy and convenience.

Any suitable surfactant may be used in the process of this invention, including such soaps as sodium stearate, sodium oleate, ammonium oleate, potassium palmetate, sodium myristate, rosin, or dehydrogenated rosin soaps; such dispersing agents as gelatin, soluble starch, gum tragacanth, gum acacia, gum tragon, water-soluble glycol cellulose, sodium alginate, agar-agar, glue, and Turkey red oil; such emulsifiers as the sodium salts of alkyl substituted naphthalene sulfonic acid, the sodium salts of reaction products of fatty acids of high molecular weight, and hydroxy substituted or amino substituted alkyl sulfonic acids. These surfactants may be used in concentrations ranging from 0.001 to 5% of the monomer present and the most economical amounts are those employing sufficient surfactant to bring about the most desirable dispersion of the monomer in the liquid phase particularly when water is used as the liquid phase.

Any of the various polymerization catalysts known to be suitable for use in polymerizing olefinically unsaturated monomers and soluble in a liquid system, particularly in an aqueous medium, can be employed. Particularly desirable are the radical-yielding initiators and especially those soluble in water, such as hydrogen peroxide, sodium or potassium persulfate, percarbonate or perborate, and peracetic acid. About 0.01 to 5% of initiator or catalyst is to be used in the polymerization system.

The temperature of operation in the process of the invention will vary over considerable limits depending, for best results, on the particular polymerizable monomer being polymerized. Thus, the temperature limits may be as low as 15° C. and in extreme cases as high as about 150° C. Ordinarily temperatures from about 20° C. to 80° C. are employed.

The manner of stirring may take many forms as for example with respect to the shape of the blade fashioned to bring about mixing or agitation of the phases of the polymerization system and, of course, the speed at which the particular blade being used is rotated or moved through the system. The invention is concerned with the control of the concentration of the monomer at the reaction zone and not with the particular shape of the blade used in bringing about this concentration.

The vapor pressure in the reaction vessel may have a value below the pressure exerted on the system when the system is saturated with polymerizable monomer. Ordinarily the pressure in the reaction vessel, as described in Example 1, is about 75 p.s.i. It has been observed that pressures of only a few and as little as 1 p.s.i. below these ordinarily normal pressures will cause marked reduction in viscosity values or molecular weight of the polymer made thereby.

While certain representative embodiments and details have been shown for the purpose of illustrating the invention, it will be apparent to those skilled in this art that various changes and modifications may be made therein without departing from the spirit or scope of the invention.

What is claimed is:

1. A process for producing low molecular weight polymer of an olefinically unsaturated monomeric compound containing the polymerizable group $CH_2=C<$, which process comprises introducing said monomeric compound into an emulsion polymerization system at such a rate during substantially the entire period of the reaction that concentration of the monomer at the polymerization zone is less than that equivalent to saturation to the extent that the inherent viscosity of said polymer is at least 20% less than that obtained when producing said polymer under conditions wherein the polymerization zone is saturated with monomer during the polymerization reaction, said system comprising a surfactant, water as the diluent in which said monomeric compound is polymerizable and substantially insoluble both as monomer and as polymer and a polymerization initiator for the monomeric compound dissolved in the water, polymerizing the monomeric compound in said system and recovering the resulting polymer.

2. A process for producing low molecular weight vinyl polymer which comprises introducing vinyl monomer into a polymerization system comprising water, a water-soluble polymerization initiator for the monomer, and a surfactant, at such a rate during substantially the entire period of the reaction that the concentration of the monomer in the system at the polymerization zone is less than that equivalent to saturation to the extent that the inherent viscosity of said polymer is at least 20% less than that obtained when producing said polymer under conditions wherein the polymerization zone is saturated with monomer during the polymerization reaction.

3. A process for producing low molecular weight vinyl polymer which comprises introducing vinyl monomer into a polymerization system comprising water, a water-soluble polymerization initiator for the monomer, and a surfactant, at such a rate during substantially the entire period of the reaction that the amount of monomer available at the polymerization zone is less than that amount which would otherwise be used up before chain growth is terminated to the extent that the inherent viscosity of said polymer is at least 20% less than that obtained when producing said polymer under conditions wherein the polymerization zone is saturated with monomer during the polymerization reaction.

4. A process for producing vinyl chloride polymer which comprises introducing vinyl chloride monomer into a polymerization system comprising water, a water-soluble polymerization initiator for the vinyl chloride monomer, and a surfactant at such a rate during substantially the entire period of the reaction that the concentration of the monomer in the system at the polymerization zone is less than that equivalent to saturation to the extent that the inherent viscosity of said polymer is at least 20% less than that obtained when producing said polymer under conditions wherein the polymerization zone is saturated with monomer during the polymerization reaction.

References Cited in the file of this patent

UNITED STATES PATENTS

| | | |
|---|---|---|
| 2,570,056 | Halbig | Oct. 2, 1951 |
| 2,674,593 | Condo et al. | Apr. 6, 1954 |
| 2,689,242 | Lucht | Sept. 14, 1954 |
| 2,717,248 | Vaughan et al. | Sept. 6, 1955 |
| 2,829,133 | Coene | Apr. 1, 1958 |
| 2,829,134 | Coene | Apr. 1, 1958 |
| 2,956,047 | MacPherson et al. | Oct. 11, 1960 |